UNITED STATES PATENT OFFICE.

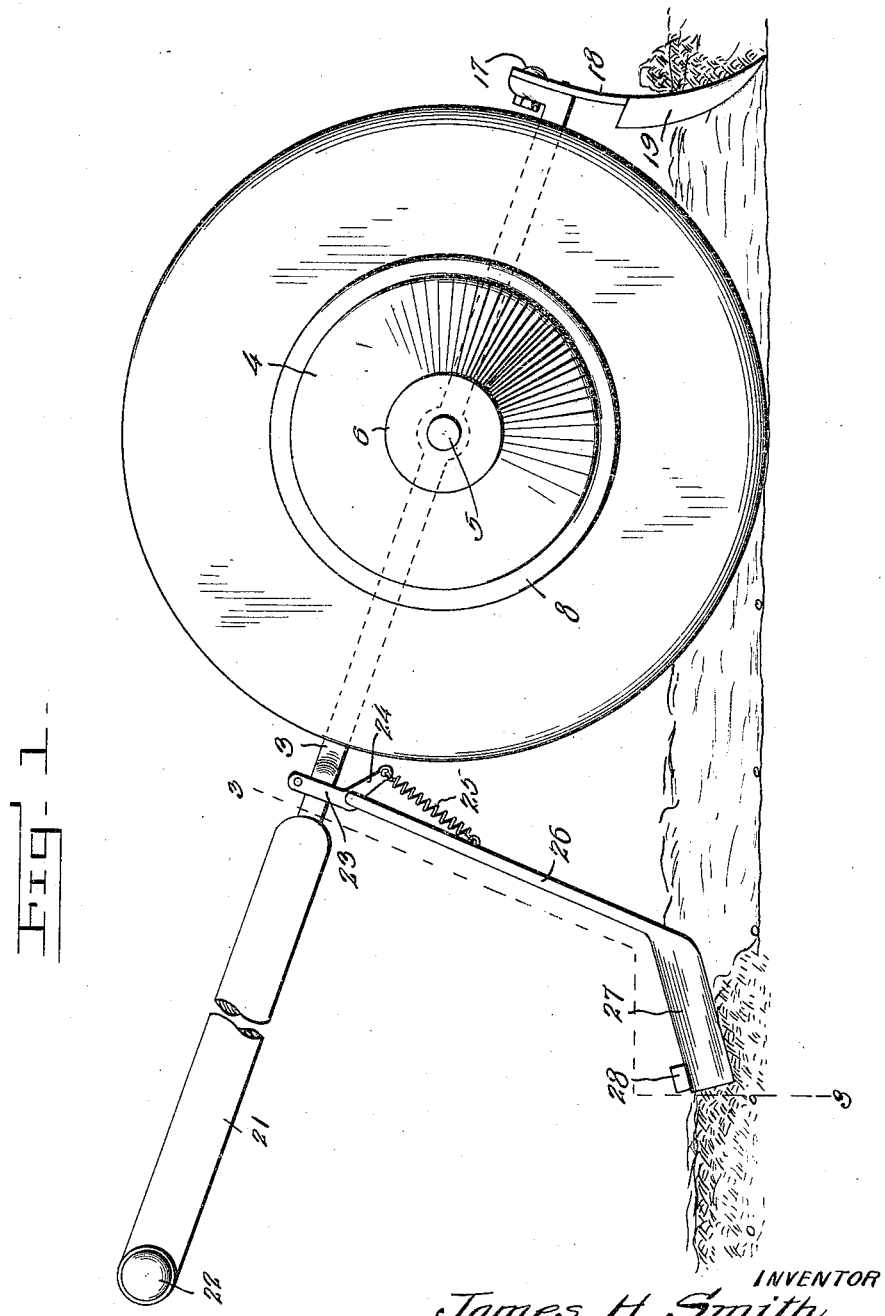

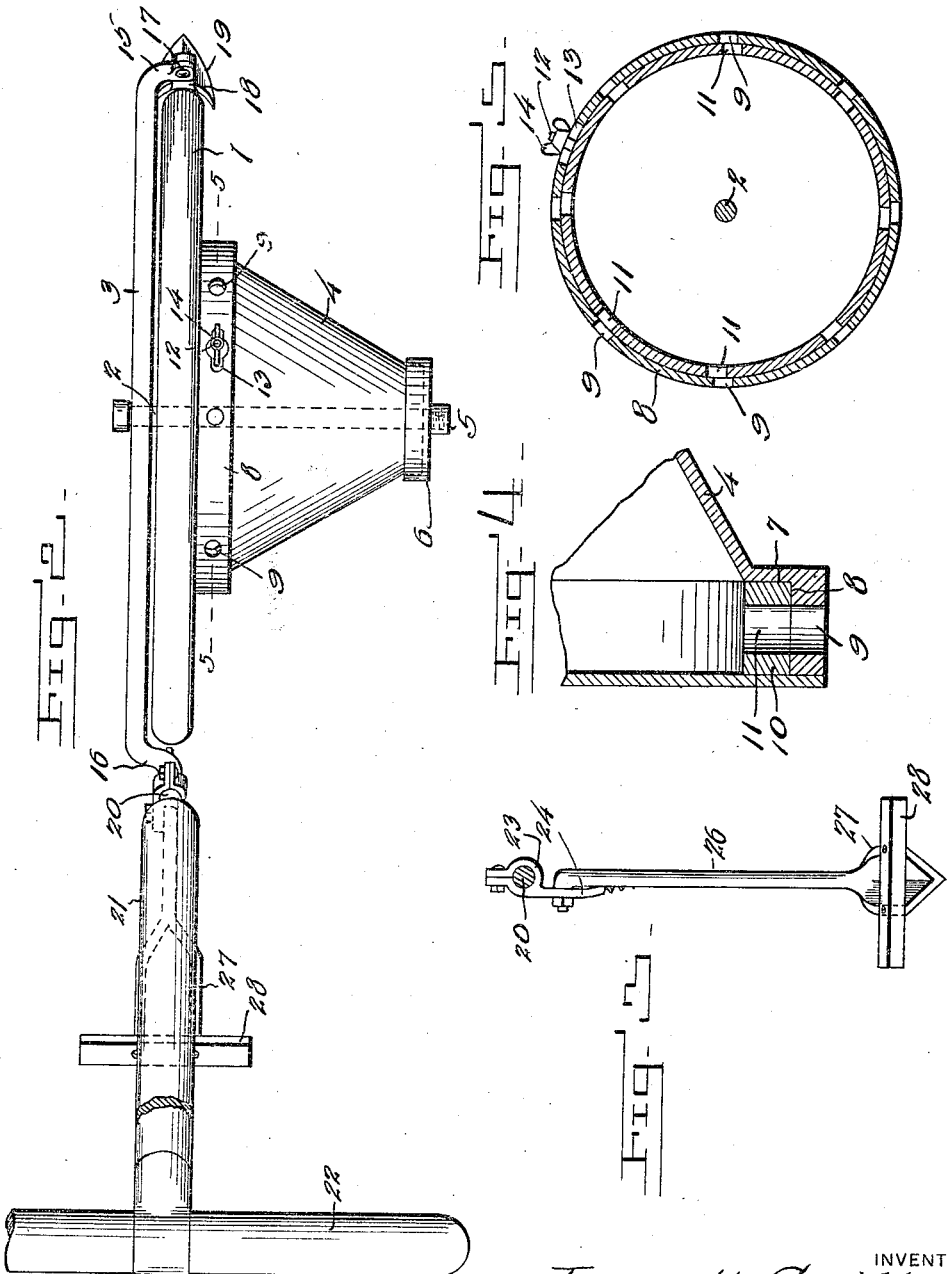

JAMES H. SMITH, OF FARMVILLE, NORTH CAROLINA.

PLANTER.

1,272,550.

Specification of Letters Patent. Patented July 16, 1918.

Application filed May 22, 1917. Serial No. 170,243.

*To all whom it may concern:*

Be it known that I, JAMES H. SMITH, a citizen of the United States, residing at Farmville, in the county of Pitt and State of North Carolina, have invented certain new and useful Improvements in Planters, of which the following is a specification.

This invention relates to agricultural implements, and more particularly to garden seed planters of the hand type.

The object of the invention is to provide a simply constructed, efficient machine of this character which may be easily pushed by hand over the ground to be planted, opening the furrow as it goes, depositing the seed therein and covering them all in one operation.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of this improved planter shown in use, the view being taken from the right side, Fig. 2 is a top plan view thereof, Fig. 3 is a vertical transverse section taken on the line 3—3 of Fig. 1, Fig. 4 is an enlarged detail sectional view through the larger end of the hopper, and Fig. 5 is a vertical section taken on the line 5—5 of Fig. 2.

In the embodiment illustrated, a wheel 1 constructed of any suitable light material, preferably wood, is shown. This wheel may be of any desired size, being preferably about fifty-four inches in circumference. This wheel 1 is mounted to revolve on an axle 2 which projects laterally from an iron bar 3 constituting the frame of the machine. This axle 2 extends through the wheel and some distance beyond it at one side thereof and supports a seed box or hopper 4, shown truncated cone-shaped in form with the larger end disposed adjacent one face of the wheel, said wheel operating to close this end of the hopper as is shown clearly in Fig. 4. The axle 2 extends from end to end through the hopper 4 and projects beyond its smaller end where it is threaded and equipped with a nut in the form of a cap 5 which retains in position a cap-like removable closure 6 fitting the small outer end of the hopper and which affords access to said hopper for filling and other purposes.

An annular peripheral channel 7 is formed on the inner face of the hopper 4 at its larger end, said channel being here shown angular in cross section, the outer wall thereof being formed by the adjacent face of the wheel 1. The peripheral wall 8 of this channel is provided with a plurality of alined spaced apertures 9 through which the seed are designed to be dropped, the distance apart of said apertures controlling the distance apart the seed will be planted.

Mounted to turn in the channel 7 is a band 10 having apertures 11 therein positioned to register with the apertures in the channel wall. This band is peripherally movable in said channel to control the size of the seed discharge openings 9. (See Fig. 5). The adjustment of this band is accomplished by means of a stud 12 which projects from the band through a peripherally extending slot 13 in the channel wall as is shown clearly in Fig. 5, said stud being equipped with a wing nut 14 whereby the band is clamped in adjusted position. It will be seen that by loosening this nut 14 and shifting the position of the band that the position of the openings 11 therein may be moved toward or away from the opening 9 in the hopper so that said hopper openings will be enlarged or decreased in size at the will of the operator or if desired, entirely closed, which latter is desirable when the device is not in operation or when the machine is being moved from place to place preparatory to planting. The ends of the iron bar 3 are bent laterally in the same direction as shown at 15 and 16, the front end 15 thereof being provided with an upstanding apertured ear 17 in which is bolted the shank 18 of a furrow opener 19. This opener 19 may be of any suitable or desired form and of any desired size according to the seed to be planted and obviously it may be removed and another substituted therefor, simply by removing the bolt which connects the shank thereof to the front end of the bar 3.

A prong or shank 20 extends rearwardly from the laterally extending arm 16 of the bar 3 and is designed to be inserted in a handle 21 which may be composed of any suitable material, preferably of wood. This handle 21 is preferably equipped with a hand grip member 22 secured in any suitable manner to its rear end and which projects laterally on opposite sides thereof.

A bracket 23 is clamped to the rear portion of the bar 3 adjacent the handle 21 thereof and has a forwardly extending arm 24 depending therefrom, with which is connected one end of a coiled spring 25, the other end of which is attached to an upright 26 of a furrow coverer 27. This furrow coverer 27 is inverted V-shaped in cross section, the flaring side walls of which are designed to engage the loose earth on opposite sides of the furrow opened by the point 19 and force the earth down into the furrow covering up the seed which have been dropped therein from the hopper 4 by the passage of the planter.

To assist in this covering operation, a cross bar 28 is preferably secured to the rear end of this coverer 27 as is shown clearly in Figs. 1, 2 and 3, and projects at its ends beyond the opposite sides of said member 27.

The spring 25 which connects the shank of upright 26 of the coverer with the bracket arm 24 is designed to hold said coverer in position when the handle 21 is raised and lowered, it being understood that this cover member is pivotally connected with the bracket and that the spring also operates to hold the foot portion 27 yieldably in engagement with the earth.

The hopper 4 may be constructed of any suitable material, preferably of tin, aluminum or the like, and when the machine is to be operated, said hopper is first filled with the seed to be planted by removing the closure 6 at the small end thereof, and after it has been so filled, this closure is replaced and secured by the cap 5. The openings 9 in the periphery of the larger end of the hopper are then adjusted according to the size and number of the seed to be planted in a single hill by adjusting the band 10 in the manner above described. Then by pushing the machine forward, the furrow opener 19 will open a furrow in advance of the hopper of the depth it is desired to plant the seed, which is accomplished by raising or lowering the handle. When the handle is raised, the opener 19 will enter the ground at a greater depth than when it is lowered and this is accomplished at the will of the operator. The large wheel 1 then follows in the path of the furrow opener and the rotation thereof discharges the seed in the hopper through the openings 9, the position of the seed in the furrow being shown in Fig. 1. The cover member 27 following at the rear of the wheel drags the loose earth down over the seed and hills it up thereover as shown clearly in Fig. 1, the cross bar 28 serving to smooth off the top of the hilled up earth.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. In a planter of the class described, a frame comprising a bar having longitudinally spaced laterally extending arms, an axle fixed to and extending laterally from said bar in the same direction as said arms, a wheel mounted to rotate on said axle between said arms, said axle projecting beyond the outer face of said wheel, a hopper supported on said projecting axle end and having discharge openings in its periphery, a furrow opener carried by the front arm of said bar and a coverer by its rear arm, and a handle connected with said rear arm and projecting rearwardly in longitudinal alinement with the wheel and parallel with the body of the bar.

2. A planter of the class described including a revolubly mounted wheel, and a truncated cone-shaped hopper secured at its larger end to one face of said wheel and having a peripheral channel formed in its inner face with openings through the peripheral wall thereof, a band mounted to move peripherally in said channel with a threaded stud projecting outward through one of the openings in said channel wall, said opening being elongated to provide for the movement of said stud, and a wing nut on said stud for clamping said band in adjusted position.

3. In a planter of the class described, the combination of a supporting frame, a handle carried thereby, a bracket also carried thereby, a seed covering member pivotally mounted on said bracket, a coiled spring connecting said member with said bracket at a point in advance of its pivotal connection therewith, a wheel revolubly mounted in said frame, a hopper carried by said wheel and having peripheral openings, and means for varying the size of said openings.

4. In a planter of the class described, the combination of a supporting frame in the form of a bar having arms extending laterally in the same direction at opposite ends thereof, a furrow opener detachably mounted on the arm at the front end of said bar, a prong extending rearwardly from the rear arm, a handle engaged with said prong, a bracket carried by said rear arm, a seed covering member pivotally mounted on said bracket, a coiled spring connecting said member with said bracket at a point in advance of its pivotal connection therewith, a wheel revolubly mounted in said frame between said arms, a truncated cone-shaped hopper secured to the outer face of said wheel with its larger end abutting said wheel and closed thereby, a removable closure for the smaller outer end of said hopper, said hopper having peripheral openings in its larger end adjacent said wheel, and means for varying the size of said openings and for closing them at the will of the operator.

In testimony whereof I affix my signature in presence of two witnesses.

JAMES H. SMITH.

Witnesses:
W. R. WILLIS,
R. A. BYNUM.